V. O. SAUER AND F. C. WEGENER.
HYDRAULIC MIXING DEVICE.
APPLICATION FILED JUNE 26, 1919.

1,341,283.

Patented May 25, 1920.

INVENTOR

UNITED STATES PATENT OFFICE.

VONNIE O. SAUER AND FRANK C. WEGENER, OF DES MOINES, IOWA.

HYDRAULIC MIXING DEVICE.

1,341,283.   Specification of Letters Patent.   Patented May 25, 1920.

Application filed June 26, 1919. Serial No. 306,995.

*To all whom it may concern:*

Be it known that we, VONNIE O. SAUER and FRANK C. WEGENER, citizens of the United States, and residents of Des Moines, in the county of Polk and State of Iowa, have invented a certain new and useful Hydraulic Mixing Device, of which the following is a specification.

The object of our invention is to provide a hydraulic mixing device of simple, durable and inexpensive construction which can be used as a domestic utensil, or may be used in drug stores or other places where drinks are mixed.

A further object is to provide such a device comprising a casing having a small opening in its wall and having a proper opening or openings in its lower end to permit the free passage of water, with a shaft rotatably mounted therein having on its lower end an agitator and on its upper end a plural bladed water wheel; and to provide a receptacle having a cover through which said shaft is rotatably extended, said casing having on the outside a device adapted to be secured to a faucet for conducting water to and through said small hole.

With these and other objects in view our invention consists in the construction, arrangement and combination of the various parts of the device, whereby the objects contemplated are attained, as hereinafter more fully set forth, pointed out in our claims and illustrated in the accompanying drawings, in which:

Fig. 2 shows a top or plan view of the same, with the cover removed.

Fig. 3 shows a perspective view of the support in the bottom of the outer casing.

Figure 1:
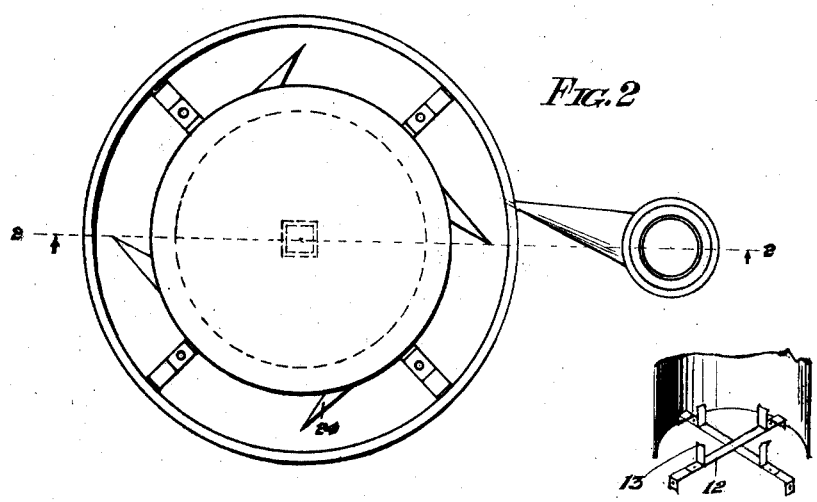
Figure 1 shows a vertical, central, sectional view through our improved hydraulic mixing device.
Figure 1:
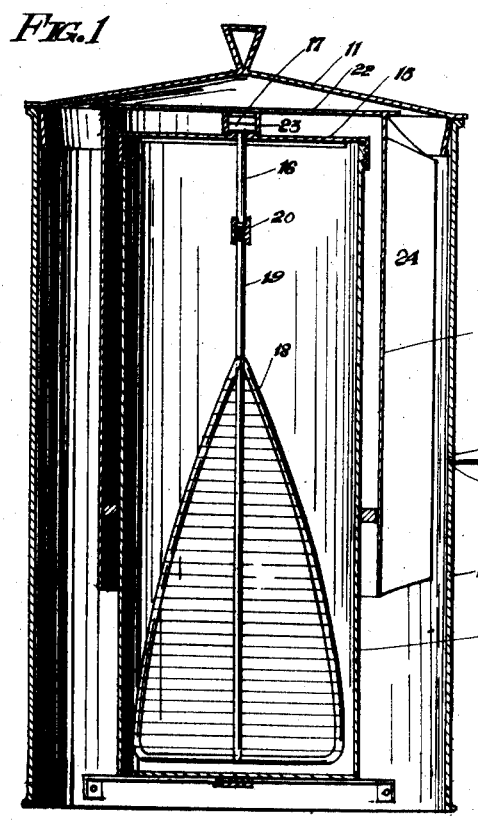

In the accompanying drawings, we have used the reference numeral 10 to indicate generally an outer casing, preferably cylindrical in form, which is provided with a removable cover 11 and is preferably open at its lower end.

Mounted in the lower end of the casing 10 is a supporting stand or bracket 12 having a plurality of spring clip devices 13 for receiving and gripping the bottom of a cylindrical receptacle 14 received in the casing 10.

The receptacle 14 is of considerably less diameter than the casing 10 and is preferably provided with a screw cover-cap 15.

Rotatably mounted in the cover cap 15 is a shaft 16 on the upper end of which is a nut 17 or other engaging device.

The shaft 16 is designed to be detachably connected with an agitator 18 having a stem or shaft 19. Any suitable means may be used for connecting the shafts 16 and 19.

In the accompanying drawings, we have shown the adjacent ends of said shafts screw-threaded and connected by means of an internally screw-threaded sleeve 20.

We provide in connection with the parts hereinbefore described a hollow cylindrical member 21, having a closed top 22, provided on its under side with a socket or the like 23 which may be rectangular in cross section to receive the nut 17. The member 21 is provided on its exterior with a plurality of blades or wings 24.

In the wall of the casing 10 there is provided an opening 25 preferably arranged substantially tangentially with relation to the member 21. The opening 25 is quite small.

Connected with the opening 25 is the small end of a water conducting member 26 which is preferably substantially funnel-shaped and has at its outer end an upward extension 27 having at its upper end an annular, outwardly extending flange 28.

Mounted on the extension 27 is a hollow, cylindrical internally screw-threaded member 29 designed to be screwed on to a faucet and having at its lower end an inwardly extending flange 30 overlapping the flange 28.

By means of the device last described the mixing device may be mounted on a faucet.

In the use of our device, the cover 11 is removed, the member 21 is removed and the receptacle is filled or partially filled with the drink to be mixed.

The cover 15 is then placed on the receptacle 14 and the receptacle 14 placed in the casing 10 with its bottom received by the slips or engaging members 13. The member 21 is then placed in position with the nut 17 received in the socket 23 and the cover 11 is placed on the casing 10.

When the faucet is slightly opened, water will be forced through the member 26 and the hole 25 with great pressure and a fine strong stream of water will be driven against the member 21 and the wings 24 imparting to the member 21 a rotary movement which will be in turn imparted to the agitator 18. Insomuch as the water can freely pass downwardly out of the casing 10, the whirling movement of the member 21 and the agitator 19 will be much more rapid than would be the case if such whirling movement had to be imparted also to a considerable body of water.

It will be seen that our device is of very simple and inexpensive construction and may be of such material and size and at such price that it may be used for domestic purposes or may be used in public places such as drug stores or soft drink parlors.

Some changes may be made in the construction and arrangement of the parts of our device without departing from the essential features and purposes thereof, and it is our intention to cover by our claims any modified forms of structure or use of mechanical equivalents which may be included within the scope of our claims.

We claim as our invention:

1. In a device of the class described, a casing sufficiently open at its lower end to permit the free passage of water, a support in the lower end of said casing, a receptacle of smaller diameter than the casing, a cover for said receptacle, a shaft rotatably mounted in said cover, an engaging member on said shaft above said casing, an agitator operatively connected with said shaft, a cylindrical member having a closed top provided with an engaging member for coacting with said first engaging member, blades on the exterior of said cylindrical member, said casing having an opening in its wall, and means connecting said opening with flowing water under pressure.

2. In a device of the class described, a casing sufficiently open at its lower end to permit the free passage of water, a support in the lower end of said casing, a receptacle of smaller diameter than the casing, a cover for said receptacle, a shaft rotatably mounted in said cover, an engaging member on said shaft above said casing, an agitator operatively connected with said shaft, a cylindrical member having a closed top provided with an engaging member for coacting with said first engaging member, blades on the exterior of said cylindrical member, said casing having an opening in its wall, means connecting said opening with flowing water under pressure, and means for detachably connecting said agitator with said shaft.

Des Moines, Iowa, November 30, 1918.

VONNIE O. SAUER.
FRANK C. WEGENER.